United States Patent [19]

Stumphauzer et al.

[11] Patent Number: 5,260,081
[45] Date of Patent: Nov. 9, 1993

[54] PROCESS AND APPARATUS FOR RAPIDLY CARBONATING A LIQUID BEVERAGE

[75] Inventors: William C. Stumphauzer, 44550 Stang Rd., Elyria, Ohio 44035; Hugh F. Groth, Richfield, Ohio

[73] Assignee: William C. Stumphauzer, Elyria, Ohio

[21] Appl. No.: 979,067

[22] Filed: Nov. 19, 1992

[51] Int. Cl.⁵ .......................... A23L 2/00; B01F 3/00
[52] U.S. Cl. ............................ 426/477; 99/323.1; 261/DIG. 7
[58] Field of Search ............ 426/477; 99/323.1, 323.2; 261/DIG. 7; 222/1, 129.1

[56] References Cited

U.S. PATENT DOCUMENTS

| | | | |
|---|---|---|---|
| 2,826,401 | 3/1958 | Peters | 261/DIG. 7 |
| 3,583,601 | 6/1971 | Ayers | 222/129.1 |
| 3,731,845 | 5/1973 | Booth | 222/129.1 |
| 3,752,452 | 8/1973 | Iannelli | 261/DIG. 7 |
| 4,040,342 | 8/1977 | Austin et al. | 261/DIG. 7 |
| 4,139,123 | 2/1979 | Castillo | 222/129.1 |
| 4,140,245 | 2/1979 | Castillo | 222/129.1 |
| 4,216,879 | 8/1980 | McMillin | 222/1 |
| 4,482,509 | 11/1984 | Iannelli | 261/DIG. 7 |
| 4,493,441 | 1/1985 | Sedam et al. | 222/129.1 |
| 4,526,730 | 7/1985 | Cochran et al. | 99/323.1 |
| 4,632,275 | 12/1986 | Parks | 222/129.1 |
| 4,636,337 | 1/1987 | Gupta et al. | 261/64.3 |
| 4,660,741 | 4/1987 | Kirschner et al. | 222/1 |
| 4,688,701 | 8/1987 | Sedam | 222/129.1 |
| 4,708,827 | 11/1987 | McMillin | 426/477 |
| 4,719,056 | 1/1988 | Scott | 261/DIG. 7 |
| 4,742,939 | 5/1988 | Galockin | 222/129.1 |
| 4,745,853 | 5/1988 | Hoover | 261/DIG. 7 |
| 4,940,164 | 7/1990 | Hancock et al. | 261/DIG. 7 |

FOREIGN PATENT DOCUMENTS 412849   7/1934   United Kingdom .

*Primary Examiner*—George Yeung
*Attorney, Agent, or Firm*—Paul E. Milliken; Lee A. Germain

[57] ABSTRACT

A beverage carbonator having a pitcher shaped carbonation vessel which is detachably pneumatically connected to a reaction vessel in which carbon dioxide is produced by releasing internally stored water into a carbon dioxide generating chemical and passing the carbon dioxide into the carbonation vessel where it is dissolved into a liquid beverage. The carbonation vessel can be reconnected to the reaction vessel to recarbonate the unused portion of the beverage after it loses carbonation over a period of time and then disconnected for pouring the remainder of the beverage from the carbonation vessel.

39 Claims, 11 Drawing Sheets

PROCESS AND APPARATUS FOR RAPIDLY CARBONATING A LIQUID BEVERAGE

FIELD OF THE INVENTION

This invention relates to carbonated beverage machines and in particular to a portable apparatus for rapidly carbonating liquids with chemically generated carbon dioxide produced in a separate detachable apparatus.

The present invention is a further development of my prior invention which is described and claimed in my prior copending application Ser. No. 07/736,628 Filed Jul. 26, 1991 and allowed on Aug. 24, 1992.

BACKGROUND OF THE INVENTION

Carbonated beverages range in variety from carbonated water, knows as soda water or sparkling water, to a carbonated water flavored with natural or artificial flavors such as orange, lemon-lime, cola, and many more.

The amount of carbon dioxide gas dissolved into these products is usually referred to as Volume of $CO_2$ per Volume of Liquid. The higher the volume of $CO_2$ per unit Volume of Liquid, the greater the sparkle and effervescence of the beverage. Although the desirable level of carbonation in a beverage is a matter of personal preference, packaged soft drinks are usually made with 3.5 to 4.0 volumes of carbon dioxide for colas, 4.0 to 5.0 Volumes of $CO_2$ for seltzers and soda water and generally less that 3.0 volumes for orange flavor. One of the disadvantages of packaged carbonated beverages is that the carbonation level is fixed and not available at different levels to suit different personal tastes.

Other disadvantages of packaged carbonated beverages include the unnecessary cost of packaging and transportation of a product that is comprised essentially of water and the cost of disposal or recycling of the package. Still further is the problem that once the pressurized beverage container is open to the atmosphere, the beverage left unconsumed and unpressurized tends to lose carbonation and go flat thus wasting the unconsumed portion.

Several products have been developed to overcome the above noted problems and make possible the preparation of carbonated beverages in the home.

One such product is described in Norwegian Patent No. 52210. This device uses a high pressure metal cylinder to supply carbon dioxide to carbonate water. Disposable high pressure gas cylinders are sufficiently expensive to offset any price advantage sought through the use of a portable carbonation device. In addition, they are inconvenient to procure and present a waste disposal problem with the empty cylinder.

Furthermore, in operation, this device does not produce acceptable carbonation with a practical waiting period because a pressure equilibrium between the $CO_2$ cylinder and carbonate bottle is established soon after the $CO_2$ cylinder is connected to the bottle. This pressure equilibrium prevents further flow of gas from the cylinder until the $CO_2$ is gradually absorbed by the water.

U.S. Pat. No. 4,719,056 (Scott) also discloses a method of carbonating water with propellent carbon dioxide packaged in a high pressure metal cylinder. The method for dissolving carbon dioxide gas into water through use of high speed rotating vanes is a very effective means to achieve rapid carbonation at high $CO_2$ Volume levels; however, this device has the disadvantage of the cost of a source of rotating mechanical motion. A further disadvantage is the requirement of a rotary seal on the mixing shaft to separate the pressurized carbonation chamber from atmospheric pressure. Rotary seals are known to be prone to leakage and premature failure especially when they are used at the elevated pressures specified.

Home carbonating devices requiring the use of $CO_2$ gas packaged in gas cylinders as described by U.S. Pat. No. 4,719,056 (Scott) and U.S. Pat. No. 4,251,473 (Gilbey) are not practical for mass distribution for several reasons. If the cylinders are single use and, therefore disposable, the cost of the carbon dioxide and the cylinder spread over the quantity of carbonated beverage they produce is significantly higher than the cost of an equivalent quantity of packaged carbonated beverage. If the cylinders are the reusable type, the cost of the cylinder can, of course, be divided by the number of times it is refilled; however, refilling a $CO_2$ gas cylinder is inconvenient and expensive because the cost of labor to perform the refilling is far greater that the cost of the gas itself. Complicating this situation further is the limited number of $CO_2$ refill stations, since even in advanced economic societies, $CO_2$ gas refilling stations are generally limited to serving commercial and industrial users. In order to overcome the cost and inconvenience of gas cylinder as the source of carbon dioxide for a home carbonator, several devices that derive the carbonating gas from a chemical reaction have been developed.

One such apparatus described in U.S. Pat. No. 4,347,783 (Ogden) derives the carbon dioxide from a reaction of yeast and sugar or, alternatively, from a chemical reaction of an edible acid with a carbonate in an aqueous solution. One problem with the device is that it does not produce a satisfactory level of carbonation, i.e. at least 3 Volumes of $CO_2$ or more, in a reasonable period of time.

U.S. Pat. No. 4,040,342 (Austin) discloses a gas generating chamber with a gas conduit extending into a carbonating chamber. After the chemical reaction is activated, the carbon dioxide flows into the carbonating chamber and carbonates the liquid contained therein. There are several limitations and problems with this device.

First, the time required to carbonate the liquid to 3 or more Volumes of $CO_2$ is fifteen minutes or greater. This is because the process of dissolving carbon dioxide into liquid occurs in two mechanisms; one quite rapid and the other quite slow. Some of the gas dissolves into the liquid as it bubbles to the surface and fills the head space of the carbonation tank. This $CO_2$ solution process occurs quite rapidly though it is, of course, dependent upon the rate of the chemical reaction producing the $CO_2$. Pressurized $CO_2$ in the head space acting upon the surface of the liquid is the other gas absorption mechanism. This absorption rate is slow because of the fixed interfacial exposure area between the $CO_2$ and the liquid. If this interfacial exposure area could be increased by agitation or by turbulent mixing as is taught by U.S. Pat. No. 4,719,056 (Scott) then $CO_2$ absorption would occur far more rapidly.

The other problem is the likely occurrence of transfer of some of the salt by-products of the $CO_2$ generation reaction into the liquid to be carbonated.

The reaction of edible acids (such as citric) with carbonates (such as sodium bicarbonate) in an aqueous solution is an endothermic reaction. When the reaction is first initiated, therefore, it is at its maximum temperature and its fastest reaction rate. In addition, the maximum amount of fuel for the reaction is present when it first begins. Therefore, during its initial stages the reaction produces considerable foaming and surface effervescence releasing a mist of reactant salt spray into the carbon dioxide gas being generated. This salt mist enters the carbonation chamber and ultimately the liquid being carbonated.

If hot water is used as the reactant water, the reaction rate is accelerated even further and salt contamination increases further.

U.S. Pat. No. 4,636,337 (Gupta) shows an apparatus that carbonates water rapidly with carbon dioxide generated in a reaction vessel from chemicals contained in a package. Water is added to the vessel containing the package and dissolves the package or package glue seams to expose the chemicals and react with them producing carbon dioxide gas.

One problem with this approach is that it requires a special water permeable (or soluble) package that will open and react with water after a delay time of immersion in the water. However, this delay time will vary according to the temperature of the reactant water and may begin before the user attaches the vessel to the carbonating apparatus; thus creating a potentially hazardous condition. Also, the possibility of reaction activation prior to attaching the vessel to the apparatus is always present if the user is distracted or delayed after adding water to the vessel containing the chemical package.

Further, the water soluble package containing the $CO_2$ producing chemicals must itself be contained in another package to prevent deterioration of the package and the chemicals contained therein by atmospheric humidity or exposure to water. As a result, there is a double packaging cost.

Finally, if the reactant water temperature is too high, some foaming and effervescence will occur in the reaction vessel causing reactant salt mist to enter the $CO_2$ gas conduit and contaminate the beverage therein.

For improved consumer convenience, the direct carbonation of premixed beverage is more desirable than the carbonation of unflavored water to which a flavoring must be added with each serving of soda water dispensed. With the Austin apparatus, U.S. Pat. No. 4,040,342, direct carbonation of premixed beverages would not be practical because premix flavoring syrups typically contain sugar and other ingredients that sufficiently alter the surface tension of the water syrup mix to cause the mixture to foam profusely; thus expelling much of the carbonation as it is dispensed from the pressurized carbonation vessel into a receptacle at atmospheric pressure. Most commercial soda fountains meter and mix flavoring syrup into the carbonated water after the water is dispensed from the pressurized carbonation vessel; therefore, when the syrup and carbonated water are combined, they are at atmospheric pressured (a process know in the industry as "post mix") and the foaming problem is avoided.

While the Gupta device does allow direct carbonation of premixed beverages, it does not solve the problem of the loss of carbonation in the unconsumed beverage portion left in the unpressurized container.

OBJECTS OF THE INVENTION

One object of this invention is to provide a means to rapidly carbonate liquids including premixed beverages, without the need for special water soluble packaging to contain the carbon dioxide producing chemicals.

Another object of the invention is to provide a means for re-pressurizing the container containing the carbonated beverage with $CO_2$ gas stored during the initial carbonation reaction.

A still further object of the invention is to provide an apparatus that governs the rate of reaction of the carbon dioxide generating chemicals to reduce the occurrence of reactant salt spray contamination of the beverage.

An even further object of the invention is to provide a portable, easy-to-store beverage carbonating chamber that also serves as a storage container with a releasable dispensing spout.

These and other objects of the invention will become more fully apparent in the following specification and the attached drawings.

SUMMARY OF THE INVENTION

This invention is a process and apparatus for rapidly carbonating a liquid beverage by providing a first pressure vessel and a second pressure vessel, detachably connecting the interiors of the first and second pressure vessel to each other with a gas conducting means, positioning a selected quantity of a carbon dioxide generating compound at a first location within the first pressure vessel, positioning a contained selected quantity of water at a second location within the first pressure vessel and sealing the vessel, filling a large portion of the second pressure vessel with a liquid beverage to be carbonated while leaving an unfilled headspace at the top of the vessel and sealing the vessel, releasing the contained quantity of water into the carbon dioxide generating compound in the first pressure vessel to chemically react with the compound and generate carbon dioxide gas in sufficient volume to increase its pressure causing the gas to pass into the second pressure vessel and partially carbonate the liquid beverage therein and fill the headspace with pressurized carbon dioxide, disconnecting the second pressure vessel from the first pressure vessel while retaining the gas pressure within both vessels, manually shaking the second pressure vessel to mix the liquid beverage and carbon dioxide gas therein to further carbonate the liquid beverage, and releasing the pressure from the second pressure vessel prior to pouring a desired amount of the carbonated beverage from the second pressure vessel.

DESCRIPTION OF THE PREFERRED EMBODIMENTS

Figure 1:
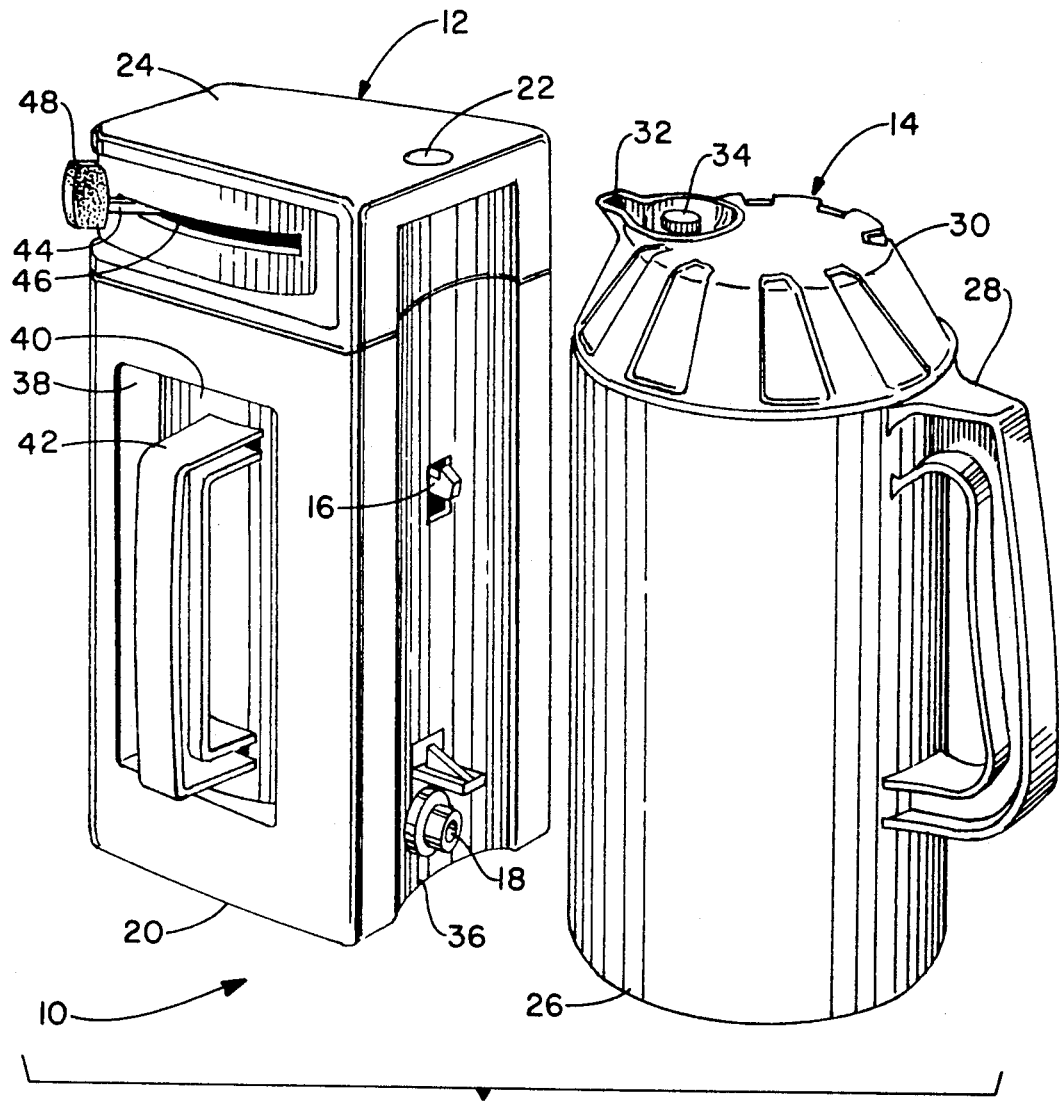
FIG. 1 is a perspective view of one embodiment of the invention showing a carbonation vessel separated from a carbon dioxide generator assembly.

Referring now to FIG. 1, the numeral 10 indicates the overall apparatus which is a portable carbonation machine for rapidly carbonating liquid beverages. The carbonation machine 10 has a gas generator assembly 12 for producing carbon dioxide gas and a carbonation tank or pitcher 14 which is removeably connectable to the gas generator assembly 12 by a latch mechanism 16 and a quick-release pneumatic coupling 18 both of which project from a housing 20 of the gas generator assembly 12. The latch mechanism 16 and the coupling 18 are released by pressing a button 22 on the top of the housing. The latch mechanism 16 and coupling will be described later in more detail in a description of FIG. 6.

The housing 20 has a top portion 24 which can be removed for access to the working parts inside.

The carbonation tank 14 is shaped to form a pitcher, with a hollow cylindrical container 26, a handle 28 attached to the container 26 thereof and a removeable closure lid 30 having a seal ring 31 which sealingly engages the top of the container 26 and forms the carbonation tank or pitcher 14 as a pressure vessel for carrying out the carbonation of liquids. The lid 30 has a pour spout 32 which contains a closure valve 34 which will be explained later in detail relative to FIGS. 7A through 7B.

The housing 20 has a concave cavity 36 on one side thereof into which a portion of the carbonation tank 14 is inserted to engage the latch 16 and coupling 18.

Another side of the housing 20 has a rectangular opening 38 into which a cylindrical reaction vessel 40 having a handle 42 is inserted for sealing engagement with a closure lid assembly which will be shown and explained in detail later in other figures of the drawings.

A cam shaft lever 44 protrudes from a horizontal slot 46 in the housing 20 and has a tab shaped knob 48 for moving the cam shaft lever 44 from side to side and for rotating the lever 44 back and forth about its own longitudinal axis. The movement of the cam shaft lever 44 seals the reaction vessel 40 and starts a chemical reaction to generate carbon dioxide as will be explained later.

Figure 2:
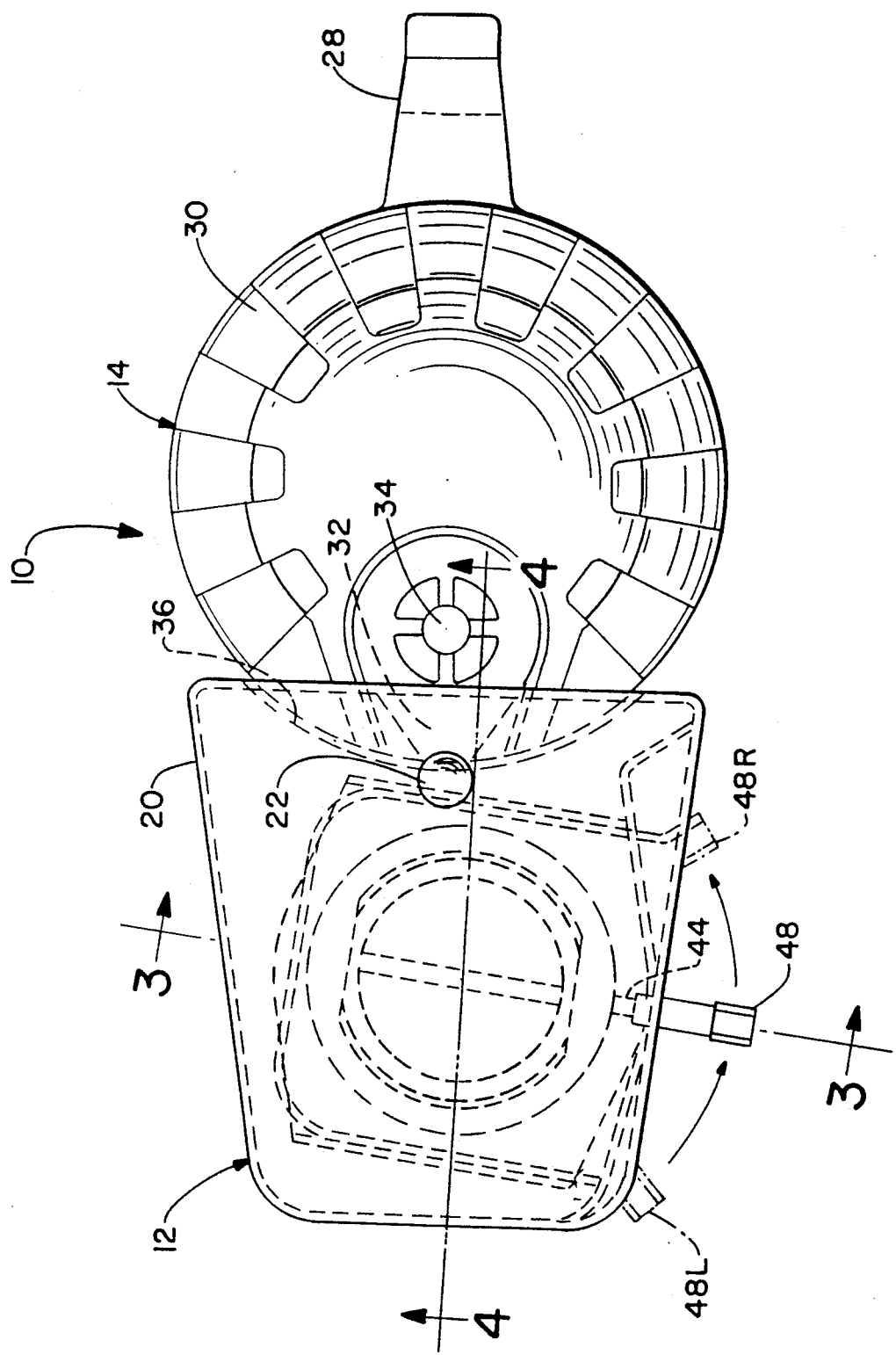
FIG. 2 is a top plan view of the embodiment shown in FIG. 1 with the carbonation vessel operatively connected to the carbon dioxide generator assembly.

FIG. 2 shows a top plan view of the carbonation pitcher 14 operatively attached to the 12 gas generation assembly with the pitcher 14 nesting in the concave cavity 36. The cam lever knob 48 is shown in ghost line moved to the left as 48L and to the right as 48R.

Figure 3:
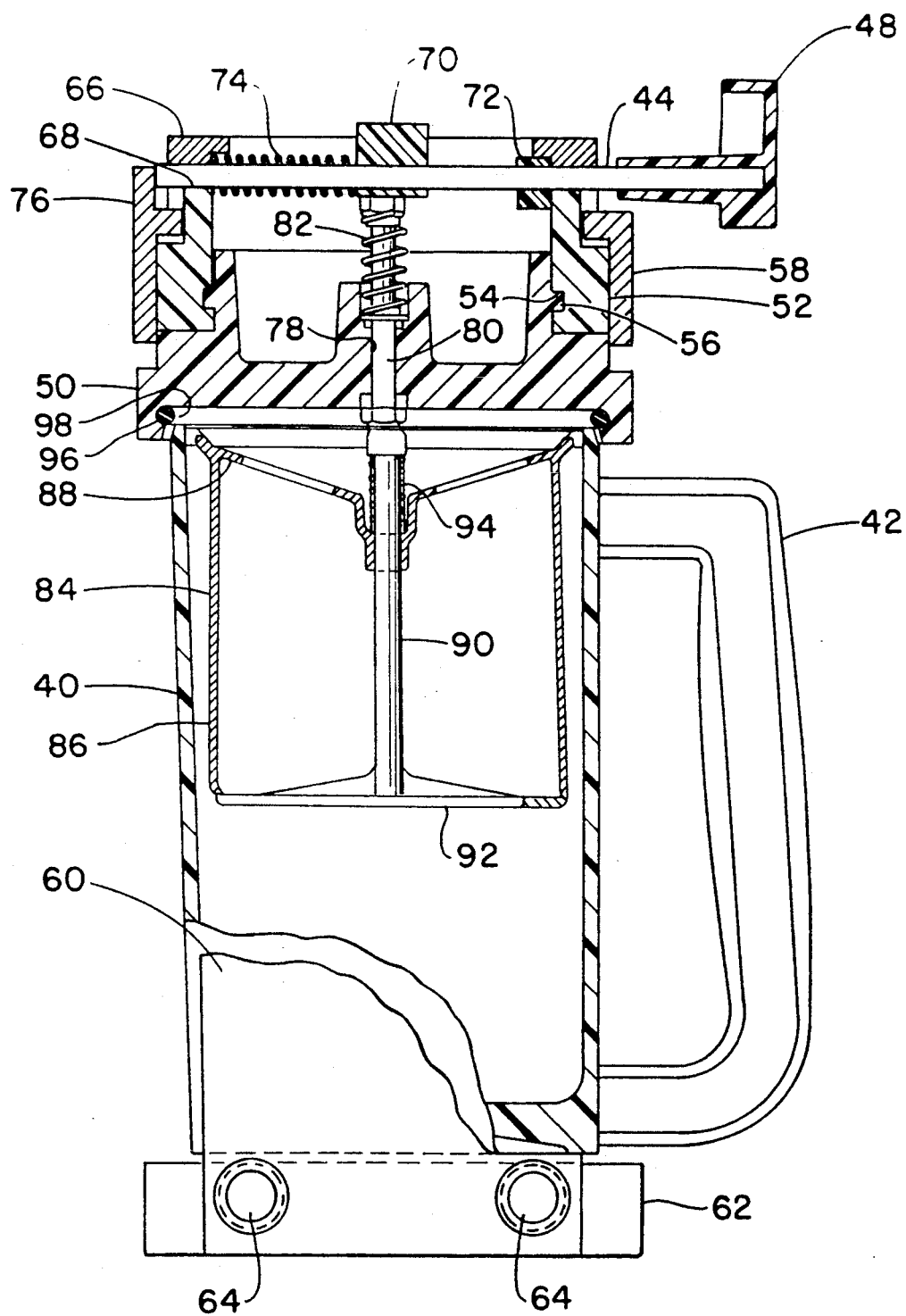
FIG. 3 is a side cross-sectional view of the carbon dioxide generator vessel and lid taken on line 3—3 of FIG. 2.
Figure 4:
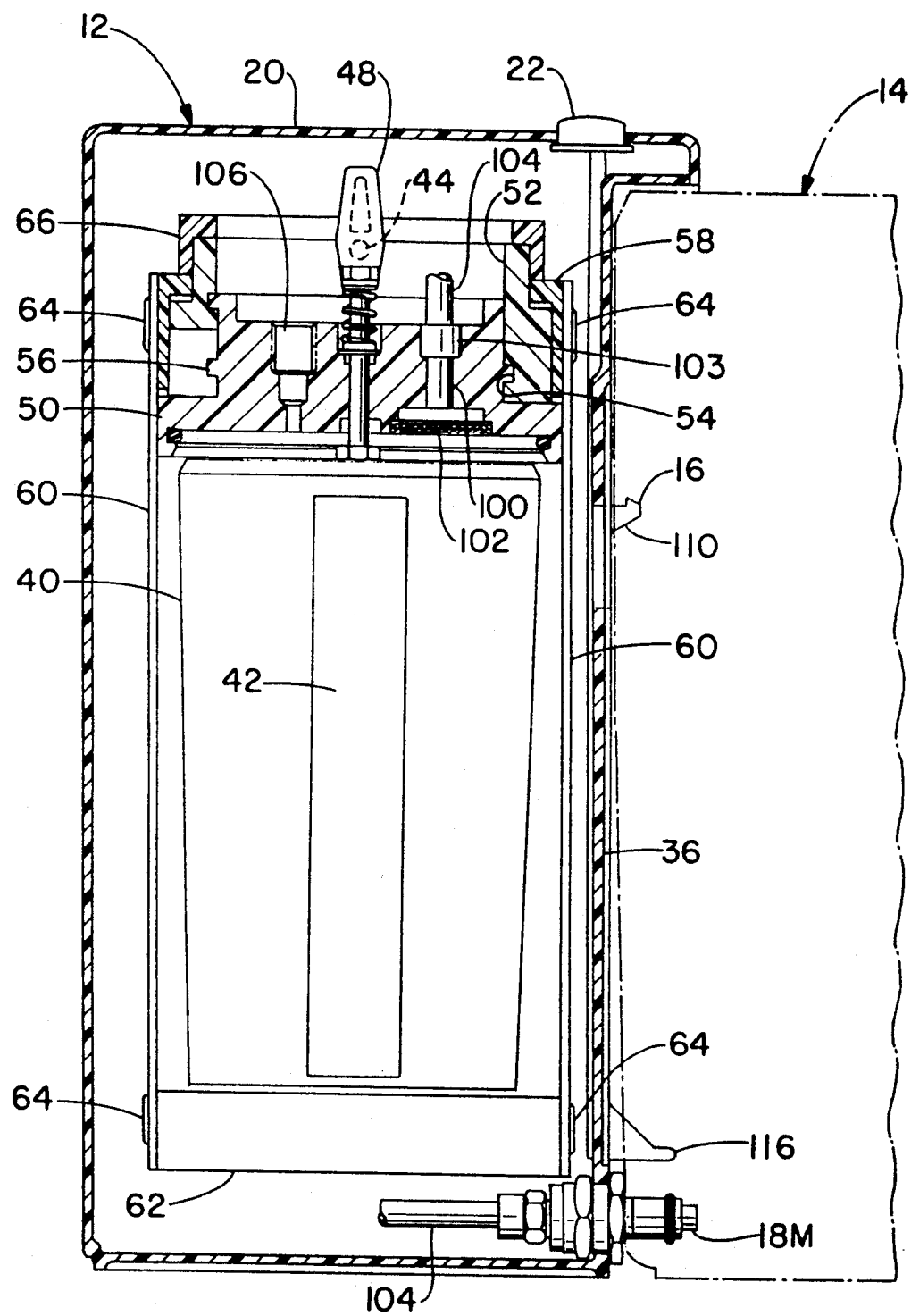
FIG. 4 is a front cross-sectional view of the carbon dioxide generator assembly taken on line 4—4 of FIG. 2 connected to the carbonation vessel.

Referring now to FIG. 3 showing a cross-sectional view of the reaction vessel 40 looking from one side and FIG. 4 showing the front of the reaction vessel 40 which is positioned within the housing 20 and located below a closure top 50 which is moveable upward from and downward into sealing engagement with the top edge of the reaction vessel 40 by rotation of a threaded cam ring 52 having internal threads 54 which engage external threads 56 on the closure top 50. The cam ring 52 is enclosed by a retaining ring 58 which is fixedly attached on opposite sides thereof by a pair of spaced apart opposed side plates 60. The side plates 60 are similarly attached at the bottom end to a base block 62 by rivets 64 or any other suitable means. The base block 62 is fastened to the housing 20 in any appropriate manner. A cap ring 66 fits on top of the retaining ring 58 and aids in holding the cam ring 54 and the lever 44 in position.

Figure 8:
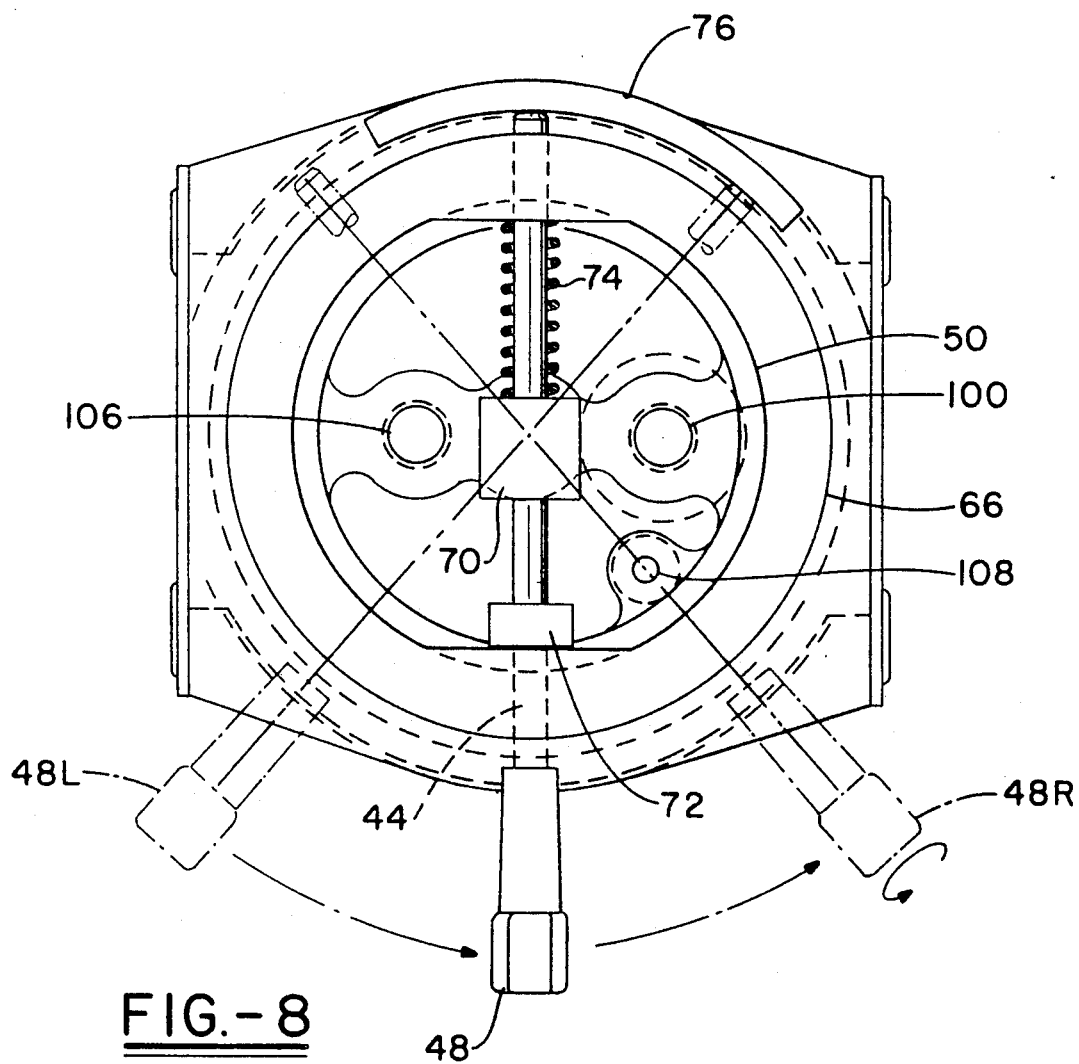
FIG. 8 shows a top plan view of the carbon dioxide generator assembly with the top of the housing removed to show the structural details of the apparatus.

Thus it can be seen that when the lever 44 is moved from left to right as shown in FIGS. 1 and 8, it rotates the cam ring 52 causing the closure top 50 to move up and down in relation to the reaction vessel 40.

The lever 44 which is a round rod is rotatably and slideably mounted in holes 68 in the cam ring 52. The lever 44 carries a large eccentric cam 70 and a smaller eccentric cam 72. A spring 74 biases the lever to the right or with the knob 48 in an extended position. As shown in FIGS. 3 and 8, a curved wall extension 76 on the retaining ring 58 prevents the lever 44 from being pushed in when it is in either the left or center positions shown in FIG. 8. When the lever 44 is moved to the far right position shown it FIG. 8 it can be pushed in the longitudinal direction since it clears the end of the curved wall 76. The reason for moving the lever 44 in this manner will be explained later.

The closure top 50 of the reaction vessel 40 has a center hole 78 through which extends a vertically slideable actuator pin 80 which is biased in an upward position by a spring 82. The pin 80 is forced in a downward position by the cam 70 when the lever 48 is rotated 180° from the position shown in FIG. 3.

As shown in FIG. 3, a water canister 84 is removeably positioned within the reaction vessel 40. The canister 84 has a cylindrical sidewall 86, a spider member 88 extending across the open top of the canister 84 and slideably supporting a center pin 90 which carries a disk shaped bottom 92 which sealingly engages the bottom edge of the sidewall 86. The pin 90 is biased upwardly by a spring 94 so that the bottom 92 is held in sealing in engagement with the sidewall 86 to contain water placed in the canister 84.

The closure top 50 has an annular recess 96 in the bottom which carries a seal ring 98. The seal ring 98 seals against the upper edge of the reaction vessel 40 when the top 50 is clamped downward against the vessel 40 as will be explained later.

As shown in FIG. 4, the top 50 has a gas outlet port 100 which contains a filter 102 and is connected to a gas transmission line 104. The gas line 104 extends from the top 50 to a male portion 18M of coupling 18 extending from the bottom of the housing 20. The top 50 also has a safety pressure release valve 106 and a cam operated vent valve 108 shown in FIG. 8 which is opened and closed by operation of the cam 72.

Figure 5:
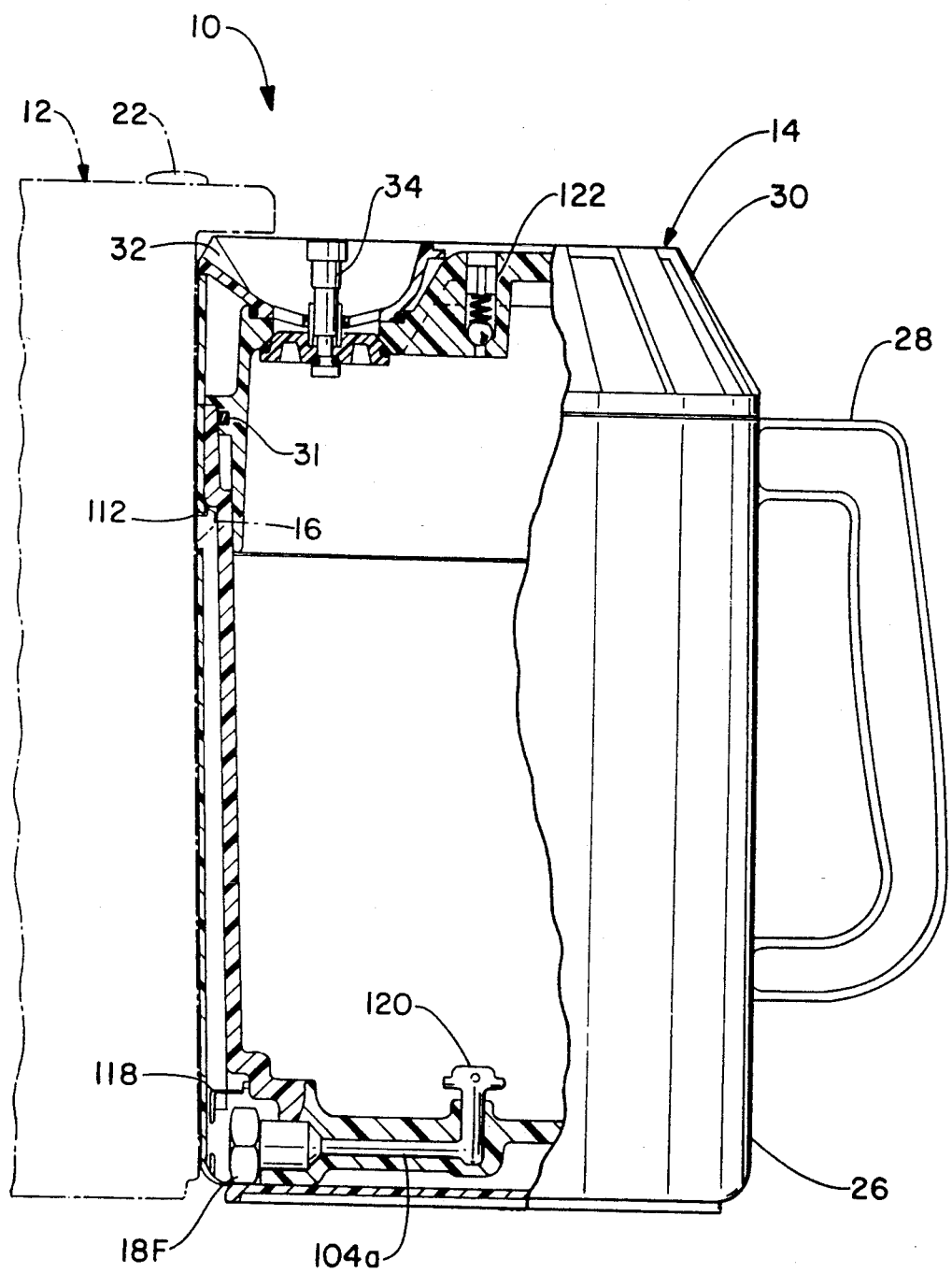
FIG. 5 is a side elevational view of the carbonation vessel with portions broken away to show the internal structure.
Figure 6:
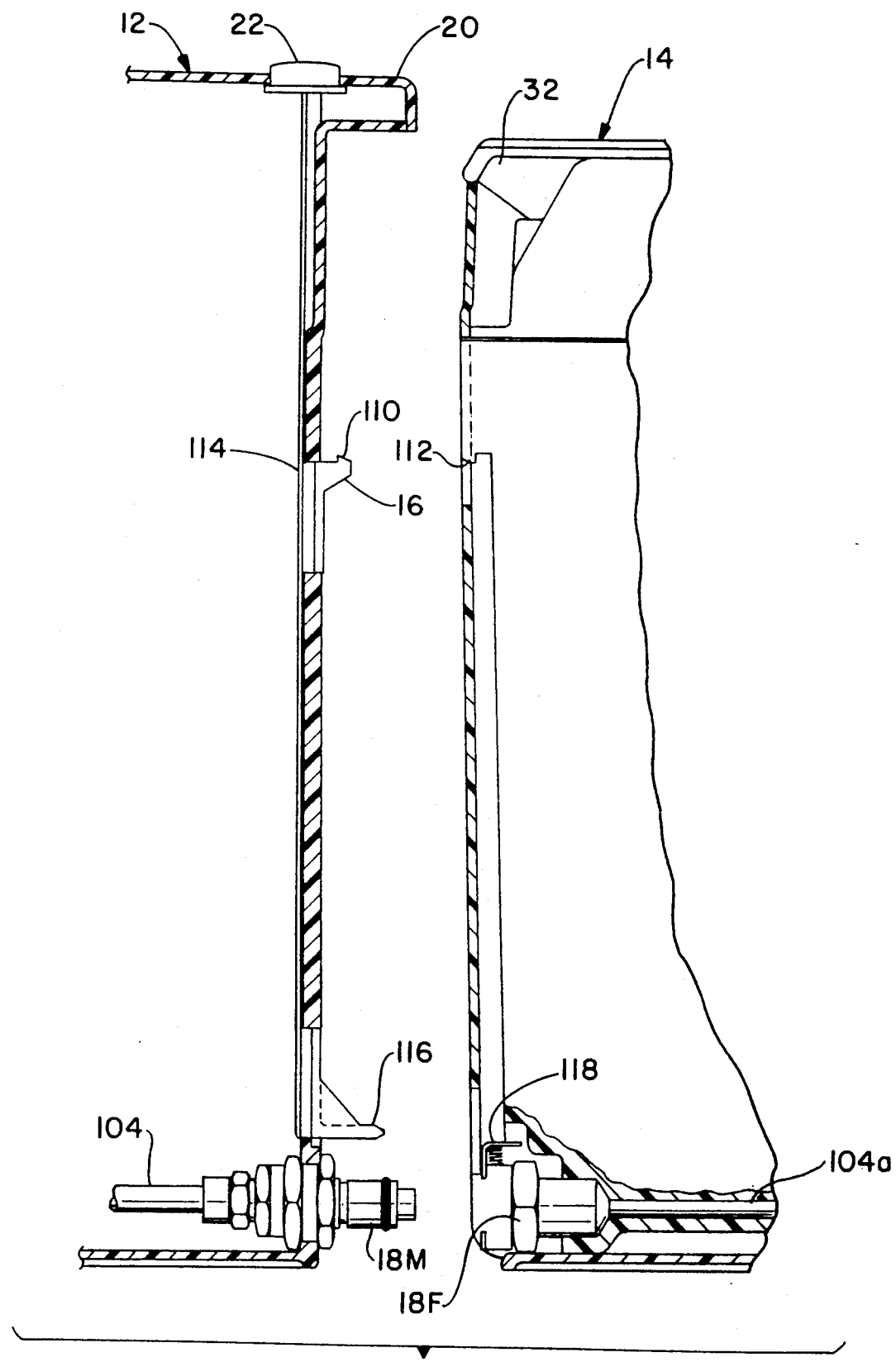
FIG. 6 is a fragmentary cross-sectional view showing the latch mechanism and self sealing gas line coupling for connecting together the gas generating vessel and the carbonation vessel.

Referring now to FIG. 5 the carbonation pitcher 14 is as previously described in FIG. 1 removeably attached to the gas generation assembly 12 by a latch mechanism 16 which is shown in detail in FIG. 6. The latch mechanism mounted within the housing 20 has a catch 110 which engages a slot 112 in the side of the pitcher 14. The catch 110 is carried on an elongated flat slide bar 114 which is moveable up and down with respect to the housing 20 by pressing the button 22. The bar 114 carries a horizontal extension tab 116 which engages a spring biased clip 118 on the female portion 18F of coupling 18 on the pitcher 14.

As the pitcher 14 is pushed into interlocking relationship with the gas generation assembly 12, the male portion 18M engages the female portion 18F to connect the gas transmission line 104 to a further extension of the line 104a in the bottom of the pitcher that in turn connects to a gas dispersion nozzle inside pitcher 14 at the bottom thereof. At the same time as the coupling 18 is connected, the catch 110 engages the slot 112 and locks the pitcher 14 and gas generator 12 together. The spring biased clip 118 pressing upwardly against the extension 116 holds the catch 10 in locked position in the slot 112. To release the pitcher 14 from the assembly 12, the button 22 is pressed down overcoming the upward bias of the clip 118 and permitting the catch 110 to be released from the slot 112 in the pitcher. When the pitcher 14 is removed from the assembly 12, the coupling portions 18M and 18F separate and simultaneously an internal valve (not shown) within each coupling seals the opening to the respective portion of the gas line 104 and 104a, thereby sealing off both the reaction vessel and the interior of the carbonation pitcher from the outside atmosphere and retain pressure within each pressure vessel.

A safety pressure release valve 122 is located in the lid 30 of the pitcher 14 to relieve any excess pressure from the interior of the pitcher.

Figure 7A:
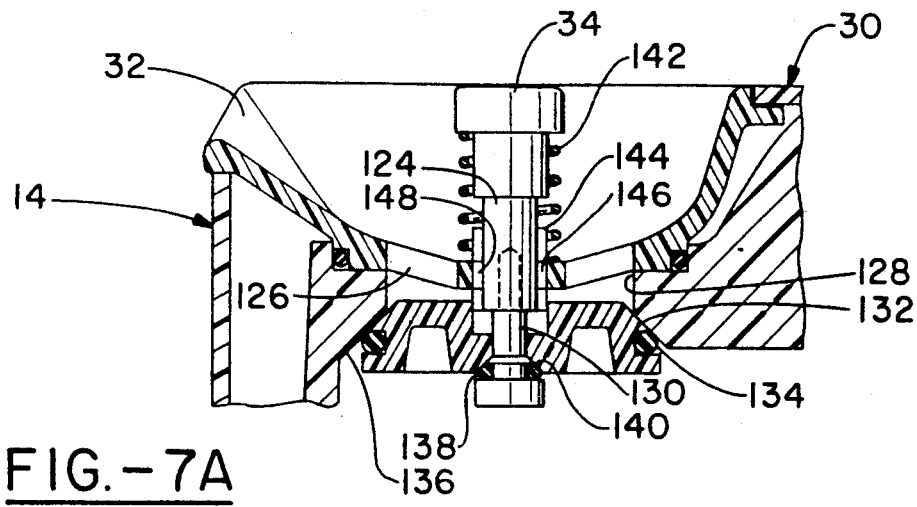
FIGS. 7A through 7C show a combined access opening and pouring spout on the carbonation vessel with a closure valve in three different positions.
Figure 7B:
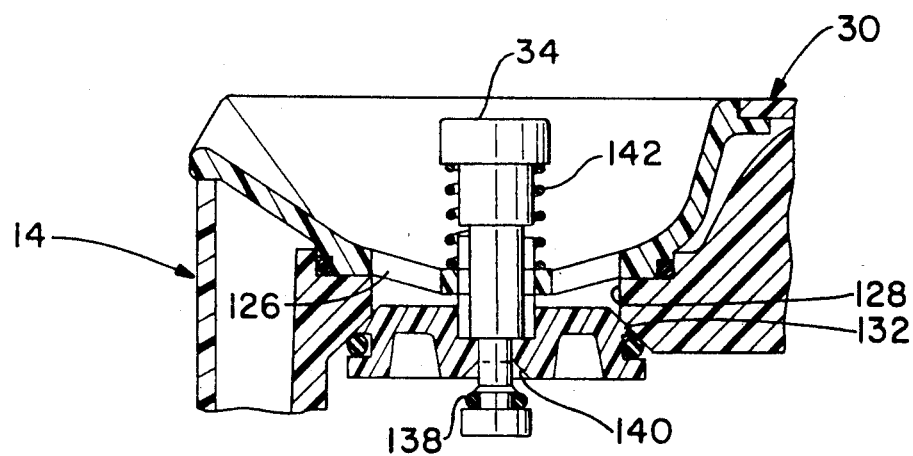
Figure 7C:
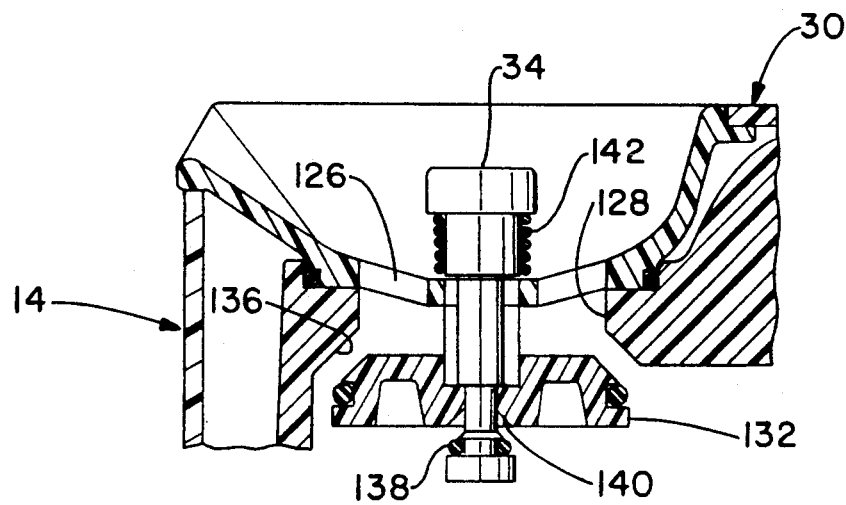

The pour spout 32 and closure valve 34 of the pitcher 14 and shown in detail in FIGS. 7A through 7C. FIG. 7A shows the valve 34 in the closed and sealed position. The valve 34 has a center stem 124 passing through a spider member 126 which bridges a pour opening 128 in the bottom of the spout. The lower end of the stem 124 passes through a center opening 130 in an annular stopper 132 which has a seal ring 134 which seals against an annular inwardly facing valve seat surface 136 surrounding the pour opening 128. The Stem 124 has a seal ring 138 on the lower end thereof which seals against an annular inwardly inclined seat 140 at the bottom of the center opening 130. The stem 124 is biased upwardly by a spring 142 which in turn hold both the seal rings 134 and 138 against their respective seats 136 and 140 thereby sealing the pitcher 14 to the outside atmosphere. The stem 124 has a pair of radially outwardly extending ribs 144 which pass through slots 146 in a center hole 148 of the spider 126.

FIG. 7B shows the stem 124 depressed to move the seal 138 down from the seat 140 and restrictively vent the pitcher 14 and release internal pressure therefrom.

In FIG. 7C the stem 124 is depressed even further to move the stopper 123 down from sealing engagement with the seat surface 136. The stem 124 is then rotated about its axis so that the flanges 144 are moved out of alignment with slots 146 and engage the bottom of the spider 126 and hold the stopper 132 in the open position to permit pouring from the pitcher 14. To close the stopper 132 the stem 124 is rotated until the flanges 144 are again aligned with slots 146 and then the stem 124 is moved upwardly by the spring 142 and closes the pour opening 128.

In operation the lid 30 of the carbonation pitcher 14 is removed and water, ice and beverage flavoring are added to the proper levels. The lid 30 is placed back on the container 26 and rotated ¼ turn to cause the lid 30 to seal. The Pitcher 14 is then pneumatically connected to the reaction vessel 40 of the gas generation assembly 12 by pushing the pitcher 14 into the cavity 36 thus causing the catch 112 to engage the slot 112 in the pitcher 14 and simultaneously causing the male coupling 18M to engage the female coupling 18F as previously described in the discussion of FIG. 6.

To produce Carbon dioxide gas, the reaction vessel 40 is removed from the housing 20 and a packet of $CO_2$ producing chemicals is emptied into the vessel 40. The water canister 84 is filled with room temperature water and placed in a suspended location in the upper portion of the reaction vessel 40 above the chemicals. The vessel 40 is then placed back inside the housing 20 in position beneath the closure top 50.

The cam lever 44 is then moved to the right causing the closure top 50 to move down and seal against the top edge of the reaction vessel 40 thereby closing the vessel. The cam lever 44 is then pushed inward closing the vent 108 in the top 50. The cam lever 44 is then rotated 180 degrees about its own axis causing the cam 70 to bear against the pin 80 and move it downwardly to bear against the center pin 90 and force open the bottom 92 of the canister 84, thereby dumping the water from the canister onto the chemicals in the bottom of the reaction chamber and starting the chemical reaction generating the carbon dioxide gas.

The carbon dioxide gas produced by the reaction passes through the porous filter 102, through the gas transmission line 104, through the coupling 18, through line portion 104a and out of the gas dispersion nozzle 120 into the water or beverage to be carbonated in the carbonation pitcher 14.

The carbonation pitcher 14 head space built into the lid 30 has a minimum cavity volume of 400 ccs when the pitcher's fluid storage capacity is two liters. The generation of $CO_2$ is at its maximum rate immediately after the reaction is first initiated then, as the reaction continues, the rate of $CO_2$ evolution slows. In order to throttle or govern the initial reaction rate and thus minimize foaming and entrainment of reaction salt mist into the carbon dioxide being evolved, a gas flow restrictor 103 is located on the inlet end of the gas transmission line 104. Since this restrictor limits the flow rate of $CO_2$ through the gas line 104, an almost instantaneous back pressure develops within the reaction vessel. This back pressure significantly reduces the rate of reaction effervescence bubbling and salt mist generation thus preventing salt contamination of the beverage. If any airborne salts are produced, they are trapped in the in-line filter 102.

As the reaction continues carbon dioxide passes through the dispersion nozzle 120, then bubbles through and is partially absorbed by the beverage. The $CO_2$ not absorbed rises to the head space cavity increasing the pressure therein until the reaction chemicals are consumed, about 3.5 minutes after reaction initiation. The pressure relief valve 122 in the lid 30 of the pitcher 14 will open if the head space pressure exceeds 90 psi, (6.328 kg/sq cm). The reaction vessel 40 is sized so that only enough $CO_2$ generating chemicals may be added to it to generate 90 psi, (6.328 kg/sq cm) in the head space of the carbonation pitcher 14. However, in the event that the reaction vessel 40 is overcharged with $CO_2$ generating chemicals, the relief valve 122 will open.

The relief valve 106 in the closure top 50 of the reaction vessel 40 performs the same function to relieve excess pressure if the gas transmission line 104 were to become blocked in any way.

About 10 minutes after the reaction was initiated, the beverage in the carbonation pitcher 14 will be carbonated to a level of 2.0 to 2.5 Volumes of $CO_2$ increasing to 3.0 to 3.5 Volumes of $CO_2$ after a total of about 20 minutes.

The carbonation pitcher 14 may be disconnected from the gas generator assembly 12 by pushing the button 22 that releases the catch 110 and the quick-disconnect clip 118 which releases the male coupling 18M from the female coupling 18F. As the pitcher 14 is pulled away from the assembly 12, a ball check valve inside of the couplings 18M and 18F closes them and seals both the pitcher 14 and the reaction vessel 40 thus maintaining internal pressure in both vessels. To decrease the time for achieving full carbonation to about 4 minutes, the carbonation pitcher 14 may be removed from the gas generator assembly 12 about 3½ minutes after the $CO_2$ reaction was initiated and then manually shaken for approximately ten seconds.

This shaking action causes the pressurized gas in the head space of the pitcher 14 to intermix with the beverage, greatly increasing the interfacial exposure area between the liquid and the gas, therefore causing rapid absorption of the pressurized $CO_2$ into the liquid. After ten seconds of shaking, the beverage is carbonated to a level of 4.0 to 4.5 volumes and is ready to serve, the accumulated time since initiation of the reaction totalling about 4 minutes.

The pitcher 14 should be allowed to stand for approximately one minute to coalesce any undissolved gas bubbles thus avoiding foam-up when the pitcher spout 32 is opened.

To open the pour spout 32, the valve stem 124 is depressed allowing a gradual restrictive venting of internal pressure to further minimize foaming the beverage while the pitcher 14 is decompressed to atmospheric pressure. An abrupt pressure drop would cause rapid surface turbulence of the beverage accelerating the creation of foam and loss of carbon dioxide from the beverage.

Carbonated beverage left uncomsumed and stored in the pitcher will gradually lose carbonation as the $CO_2$ leaves the beverage to reach equilibrium with atmospheric pressure. In order to preserve the original level of carbonation in the uncomsumed beverage, the spout 32 of the pitcher 14 is closed by rotating the stem 124 to cause it to pull the stopper 132 into sealing engagement with the pour opening 128 thus sealing the interior of the pitcher 14 to the atmosphere.

If desired, the pitcher 14 may then be reconnected to the gas generator assembly 12 including the reaction vessel 40 so that $CO_2$ left stored in the vessel 40 will flow into the carbonation pitcher 14 until pressure equilibrium is attained between the vessels 14 and 40. The repressurization of the pitcher 14 will slow or stop CO evaporation from the beverage and maintain its carbonation.

Figure 9:
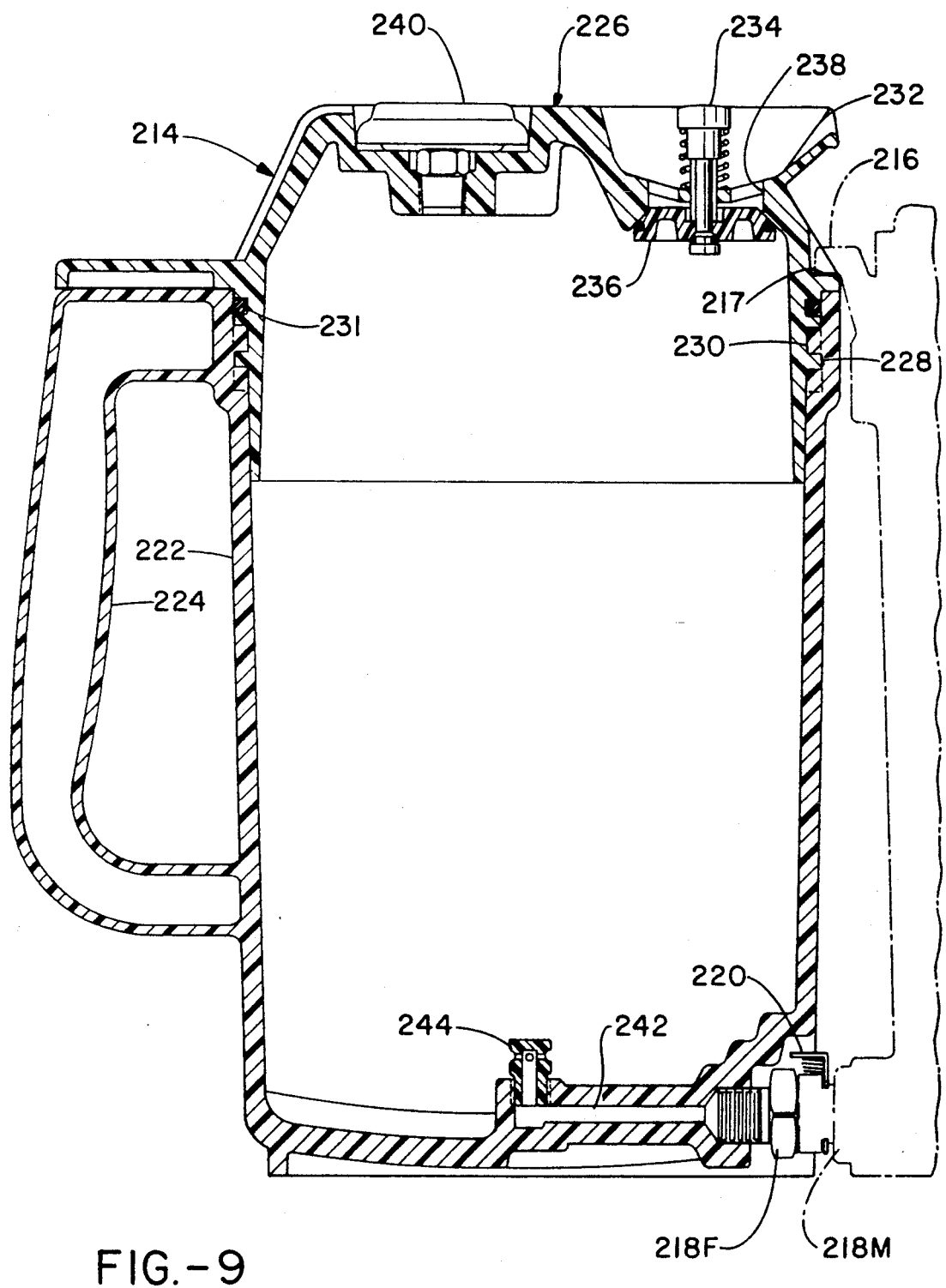
FIG. 9 is a cross-sectional view showing the internal structure of a carbonation vessel of another embodiment of the invention.
Figure 10:
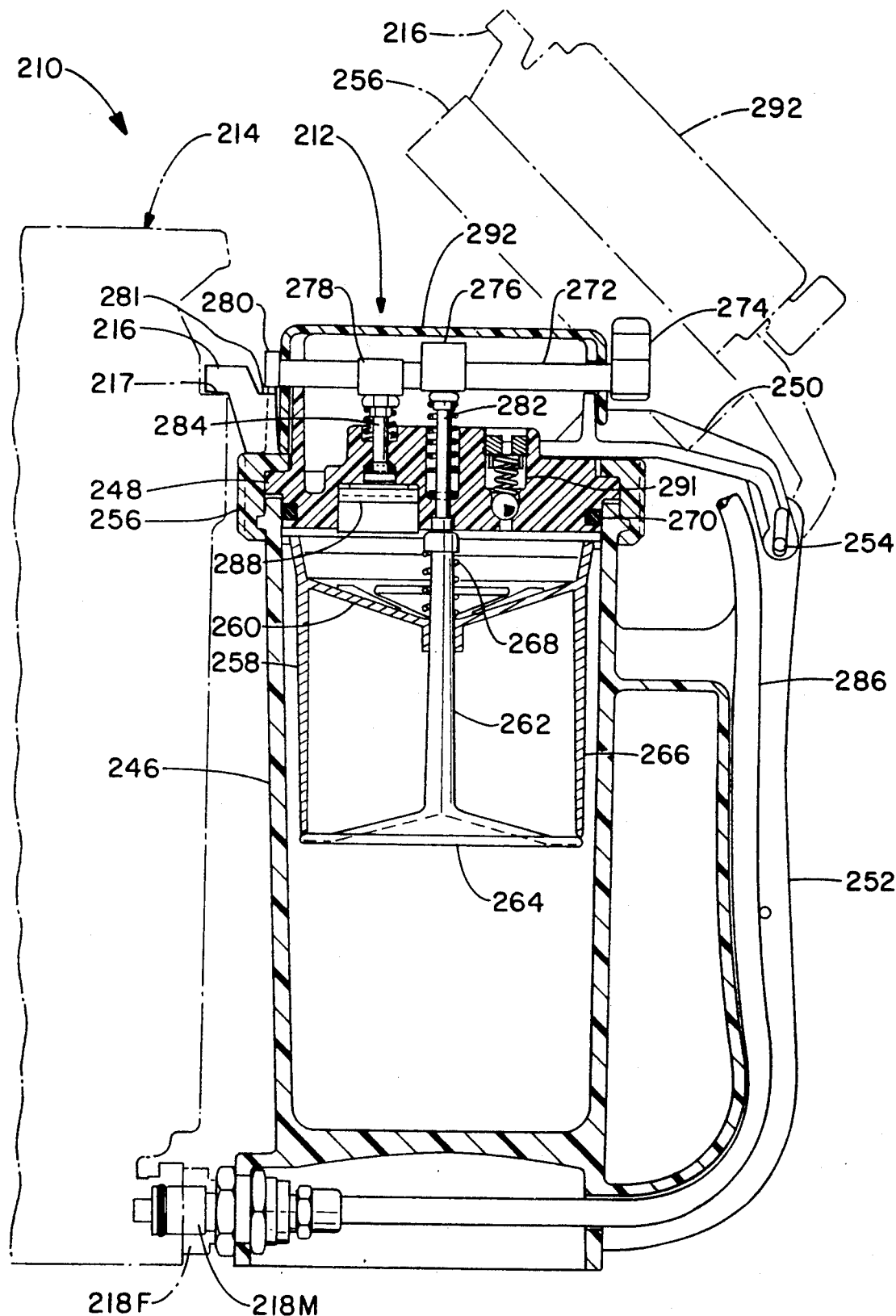
FIG. 10 is a cross-sectional view of a carbon dioxide generator vessel for connection to the carbonation vessel shown in FIG. 9.
Figure 11:
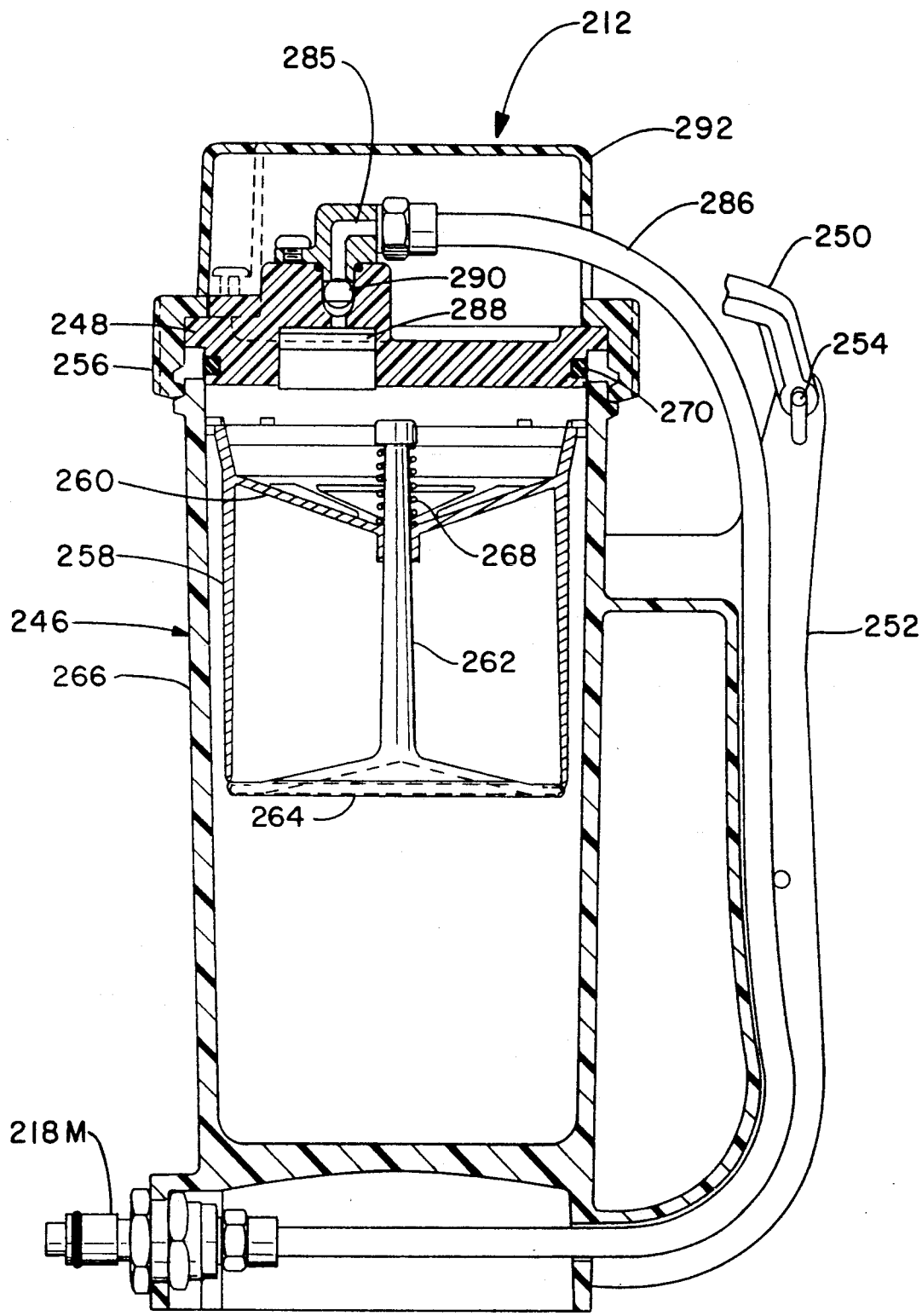
FIG. 11 is a cross-section view of the same carbon dioxide generator shown in FIG. 10 but taken at a different cross-sectional location from FIG. 10.

The embodiment shown in FIGS. 9 through 11 is quite similar to the previously described embodiment of FIGS. 1 through 8 except that the gas generator 212 is not enclosed in a housing such as the housing 20 and the manner of closing the top of the reaction vessel is different. The carbonation pitcher 214 is substantially identical to the pitcher 14 in the previous embodiment except that the apparatus for connecting the pitcher 214 and the gas generator 212 is somewhat different from the latch mechanism 16 in the prior embodiment.

Referring now to FIGS. 10 and 11, a carbonation machine is indicated generally by the number 210. The two primary components of the machine 210 is the gas generator 212 and the carbonation tank or pitcher 214 which are joined together by a connecting lug 216 which clamps onto a ledge 217 on the pitcher 214 and the male coupling 218M on the gas generator 212 which engages the female coupling 218F on the pitcher and are held together by a spring biased clip 220 as shown in FIG. 9.

The carbonation pitcher 214 in FIG. 9 has container 222 with a handle 224 attached thereto. A screw on lid 226 is held in position with external threads 228 which engage internal matching threads 230 on the container 222. The lid has a seal ring 231 which seals it to the pitcher to create a pressure vessel. The lid 226 has a pour spout 232 which is substantially identical to the spout 32 shown in FIGS. 7A through 7C and works in the same manner. For the interest of brevity it will not be described in detail except to say that it has a spring biased stem 236 which holds a stopper 236 in sealing engagement in the pour opening 238. The stem 234 is used to release pressure from the pitcher 214 by pressing down on it and the stopper 236 is opened and locked open in the same manner as previously described regarding the pour spout 32 in the previously described embodiment. The lid 226 also has a pressure relief valve 240 to relieve excess pressure from the pitcher 214. At the bottom of the pitcher 214 the female coupling 218F is connected to male coupling 218M and held in position by clip 220. The coupling 218F also connects to a short length of gas transmission line 242 leading to the gas dispersion nozzle 244 which passes carbon dioxide gas into the bottom of the pitcher 214 where it mixes with water or liquid beverage placed therein.

Referring now again to FIGS. 10 and 11, the gas generator 212 has a reaction vessel 246 with an open top which is sealingly closed by a closure top 248 to form a pressure vessel in which the generation of carbon dioxide may be carried out. The top 248 is connected by a pivot arm 250 to a handle 252 at pivot pin 254. To close the reaction vessel 246 the top 248 is swung down on top edge of the vessel 246 and a retaining ring 256 is screwed onto the top of the vessel 246. To open the vessel 246 the ring 256 is unscrewed and the closure top 248 is swung back supported by the pivot arm 250 as shown in ghost lines in FIG. 10. A water canister 258 is mounted inside the vessel 246 in the same manner as previously described in the prior embodiment. The canister 258 has a spider support 260 through which passes a support pin member 262 which carries a bottom 264 which sealing engages a cylindrical sidewall 266. A spring 268 biases the pin 262 upwardly to cause the bottom 264 to seal against the sidewall 266. A seal ring 270 seals the top 248 to the vessel 246. The top 248 carries a rotatable cam shaft 272 having a knob 274 and cams 276, 278 and 280. The cam 276 engages a spring biased pin 282 extending through the top 248 which in turn presses down on the pin 262 and opens the bottom 264 when the cam shaft 272 is rotated about its axis and dumps the water from the canister 258 onto carbon dioxide generating chemicals placed in the bottom of the vessel 246. The cam 278 opens and closes a vent valve 284 with the valve being closed when carbon dioxide is being generated and opened to release pressure prior to opening the closure top 248.

The cam 280 contacts a top edge of the retaining ring 256 and prevents the cam shaft 272 from being rotated to a position which releases the water and starts the chemical reaction until the top 248 is closed and the retaining ring 256 is screwed down to hold the top 248 on the vessel 246. The cam shaft 272 can be rotated only when the ring 256 is fully screwed down and this prevents premature release of the water. This is because the ring 256 must be in a circumferential position where the cam 280 is aligned with a depressed portion 281 on the ring 256 which permits the cam 280 and the shaft 272 to rotate.

The cam 280 engages the depressed portion 281 on the top edge of the retaining ring 256 and prevents the retaining ring 256 from being unscrewed until the vent valve 284 is opened to release internal pressure from the vessel 246. As shown in FIG. 11, a gas outlet port 285 connects to a gas transmission line 286 which in turn connects to the male coupling 218M at the bottom of the vessel 246. A filter 288 and a ball check valve 290 is located in the outlet port 285. The closure top 248 has a pressure relief valve 291 to release excess pressure from the vessel 246. The closure top 248 and the various working parts thereof are covered by a cap 292.

The operation of the embodiment shown in FIGS. 9 through 11 is substantially the same as that for the previously described embodiment in FIGS. 1 through 8 and will not be described in detail for simplicity. The primary difference is that the closure top 248 is pivotally connected to the handle 252 and is fastened to the reaction vessel 246 by manually screwing the retaining ring 256 onto the vessel 246 after the couplings 218M and 218F have been connected thereby pneumatically connecting the reaction vessel 246 and the carbonation pitcher 214.

In both embodiments of FIGS. 1-8 and FIGS. 9-11 the gas pressure is released gradually from the carbonation pitcher 214 by a restrictive vent valve since certain types of beverages would generate a large amount of foam if the pressure were released too rapidly.

In addition to the two embodiments shown herein, various other embodiments may be used without departing from the scope of the invention.

We claim:

1. A process for rapidly carbonating a liquid beverage comprising the steps of:
   (A) providing a first pressure vessel;
   (B) providing a second pressure vessel;
   (C) detachably connecting the interiors of the first and second pressure vessel to each other with a gas conducting means;
   (D) positioning a selected quantity of a carbon dioxide generating compound at a first location within the first pressure vessel;
   (E) positioning a contained selected quantity of water at a second location within the first pressure vessel and sealing the vessel;
   (F) filling a large portion of the second pressure vessel with a liquid beverage to be carbonated while leaving an unfilled headspace at the top of the vessel and sealing the vessel;
   (G) releasing the contained quantity of water into the carbon dioxide generating compound in the first pressure vessel to chemically react with the compound and generate carbon dioxide gas in sufficient volume to increase its pressure causing the gas to pass into the second pressure vessel and partially carbonate the liquid beverage therein and fill the headspace with pressurized carbon dioxide;
   (H) disconnecting the second pressure vessel from the first pressure vessel while retaining the gas pressure within both vessels; and
   (I) releasing the pressure from the second pressure vessel prior to pouring a desired amount of the carbonated beverage from the second pressure vessel.

2. The process as claimed in claim 1 including the steps of positioning the carbon dioxide generating compound in a lower portion of the first pressure vessel out of contact with the contained water, sealing the first pressure vessel to the atmosphere and releasing the water to flow into the carbon dioxide generating compound.

3. The process as claimed in claim 2 wherein the contained water is positioned above the carbon dioxide generating compound in the first pressure vessel prior to sealing the first pressure vessel to the atmosphere, then released into the carbon dioxide generating compound after sealing the first pressure vessel to the atmosphere.

4. The process as claimed in claim 1 including the step of filtering the carbon dioxide flowing from the first pressure vessel to the second vessel to prevent any liquid from the chemical reaction in the first pressure vessel from passing into the second pressure vessel.

5. The process as claimed in claim 1 wherein the carbon dioxide from the first pressure vessel is injected into the second pressure vessel in diverging streams beneath the water.

6. The process as claimed in claim 1 including the steps of resealing the second pressure vessel, reconnecting the first and second pressure vessels to permit pressurized carbon dioxide to flow from the first pressure vessel into the second pressure vessel to repressurize the second pressure vessel, disconnecting the second pressure vessel from the first pressure vessel while retaining the gas pressure in at least the second pressure vessel to maintain the carbonation of the remaining liquid.

7. An apparatus for rapidly carbonating a liquid comprising:
   (A) a first pressure vessel defining a gas generation chamber, said first vessel including sealable access means in communication with the gas generation chamber to position a carbon dioxide generating compound in the chamber and to permit the insertion of water therein out of contact with said compound;
   (B) means sealing the access means of the first pressure vessel;
   (C) means operatively associated with the first pressure vessel to release the water into the carbon dioxide generating compound within the gas generation chamber after the chamber has been sealed to chemically react with the water and generate pressurized carbon dioxide;
   (D) a second pressure vessel defining a carbonation chamber, said second pressure vessel including sealable access means in communication with the carbonation chamber to permit the insertion of liquid into said chamber to such a selected level as to fill a large portion of the chamber, and liquid outlet dispensing means for obtaining carbonated liquid from the carbonation chamber upon demand;

(E) means sealing the access means of the second pressure vessel;

(F) releasable means connecting the first and second pressure vessels together including gas conducting means having a separable joint therein operatively connecting the gas generation chamber with the carbonation chamber to permit pressurized carbon dioxide gas to flow from the gas generation chamber to the carbonation chamber and carbonate the liquid therein; and (G) sealing means associated with the gas conducting means to seal both the gas generation chamber and the carbonation chamber simultaneously with the separation of the separable joint to permit the first and second pressure vessels to be disconnected from each other and reconnected while retaining pressure in one or both of the chambers.

8. The apparatus as claimed in claim 7 wherein the means to release the water into the carbon dioxide generating compound is a filled water container positioned above the carbon dioxide generating compound in the first pressure vessel prior to sealing the first pressure vessel to the atmosphere, said container having a bottom which is biased in a normally closed sealing engagement with a sidewall means of the container, and external actuator means extending into the first pressure vessel to open the bottom of the container and release the water into the carbon dioxide generating compound after the first pressure vessel has been sealed to the atmosphere.

9. The apparatus claimed in claim 8 wherein the external actuator means is a longitudinally moveable pin which is moved inwardly into the first pressure vessel by a rotating first cam by a cam shaft outside the first pressure vessel thereby causing the moveable pin to bear against a guide pin attached to the bottom of the water container and force the bottom downwardly out of sealing engagement with the sidewall means to release the water from the container.

10. The apparatus claimed in claim 9 wherein the first pressure vessel has a normally open vent valve which is closed by a second cam rotated by the cam shaft which simultaneously rotates the first cam to activate release of water from the container.

11. The apparatus as claimed in claim 7 wherein the gas conducting means is a gas supply line which extends from the gas generation chamber into the carbonation chamber to provide a gas dispensing outlet beneath the surface of the liquid when the carbonation chamber has been filled to a sufficient level with the liquid and sealed to the outside atmosphere.

12. The apparatus claimed in claim 11 wherein the outlet end of the gas supply line contains a multiple nozzle of a configuration which delivers divergent streams of carbon dioxide beneath the surface of the liquid in the carbonation chamber.

13. The apparatus claimed in claim 7 including a filter means operatively associated with the gas conducting means, to prevent any liquid from the chemical reaction from passing into the second pressure vessel while permitting carbon dioxide to pass through the gas conducting means into the second pressure vessel.

14. The apparatus as claimed in claim 7 wherein the second pressure vessel is a pitcher shaped container and the means sealing the sealable access means is a lid having a restrictive vent valve associated with a spout to slowly release pressure from the pressure vessel and permit the pouring of carbonated liquid from the vessel after release of gas pressure therefrom.

15. The apparatus as claimed in claim 7 wherein the lid contains a pressure gage for measuring the pressure within the second pressure vessel.

16. The apparatus as claimed in claim 7 wherein both the first and second pressure vessels are equipped with excess pressure relief valves.

17. A portable carbonation machine for rapidly carbonating a liquid beverage comprising:

(A) a carbon dioxide generator unit comprising;
  (1) a housing having a base, a top assembly and vertical side means connecting the base and top assembly at a fixed spaced distance from each other, said housing defining a cavity between the base and the top assembly,
  (2) a removeable reaction vessel to be positioned in the cavity within the housing, said reaction vessel having a top access opening for inserting a carbon dioxide forming compound and water therein,
  (3) the top assembly of the carbon dioxide generator unit including a closure top moveable to and from the reaction vessel for sealing the top access opening of the reaction vessel after insertion of the carbon dioxide forming compound and water therein, and means moving the closure top into a locked position to seal the top access opening of the reaction vessel, and
  (4) means to effect contact of the water with the carbon dioxide generating compound within the sealed reaction vessel to cause the generation of carbon dioxide within the reaction vessel;

(B) a carbonation vessel having a top access opening for inserting water and other beverage ingredients, a lid for sealing the top access opening of the carbonation vessel, and liquid outlet dispensing means for obtaining a carbonated beverage from the carbonation vessel; and (C) releasable means connecting the reaction vessel and the carbonation vessel together including gas conducting means having a separable joint therein operatively connecting the interiors of the reaction vessel and the carbonation vessel to permit pressurized carbon dioxide gas to flow from the reaction vessel to the carbonation vessel and carbonate the beverage therein; and (D) sealing means associated with the gas conducting means to seal both the reaction vessel and the carbonation vessel simultaneously with the separation of the separable joint to permit the first and second pressure vessels to be disconnected from each other and reconnected while retaining pressure in one or both of the vessels.

18. The apparatus as claimed in claim 17 wherein the means to effect contact of the water with the carbon dioxide generating compound is a filled water container positioned above the carbon dioxide generating compound in the reaction vessel prior to sealing the top access opening of the reaction vessel, said container having a bottom which is biased in a normally closed sealing engagement with a sidewall means of the container, and external actuator means extending through the closure top into the reaction vessel to open the bottom of the water container and release the water into the carbon dioxide generating compound after the reaction vessel has been sealed to the atmosphere.

19. The apparatus claimed in claim 18 wherein the external actuator means is a longitudinally moveable pin which is moved inwardly through the closure top into the reaction vessel by rotating a first cam mounted on the top assembly of the housing thereby causing the moveable pin to bear against a guide pin attached to the bottom of the water container and force the bottom downwardly out of sealing engagement with the sidewall means to release the water from the container.

20. The apparatus claimed in claim 19 wherein the reaction vessel has a normally open vent valve which is closed by a second cam rotated by the cam shaft which simultaneously rotates the first cam to activate release of water from the container.

21. The apparatus claimed in claim 17 wherein the gas conducting means is a gas supply line which extends from the reaction vessel into the carbonation vessel to provide a gas dispensing outlet beneath the surface of the beverage when the carbonation vessel has been filled to a sufficient level with the beverage and sealed to the outside atmosphere.

22. The apparatus claimed in claim 21 wherein the outlet end of the gas supply line contains a multiple nozzle of a configuration which delivers divergent streams of carbon dioxide beneath the surface of the beverage in the carbonation vessel.

23. The apparatus claimed in claim 21 including a check valve associated with the gas supply line to prevent a back-flow of beverage from the carbonation vessel into the reaction vessel.

24. The apparatus claimed in claim 17 including a filter means operatively associated with the gas conducting means, to prevent any liquid from the chemical reaction from passing into the carbonation vessel while permitting carbon dioxide to pass through the gas conducting means into the carbonation vessel.

25. The apparatus as claimed in claim 17 wherein the carbonation vessel is a pitcher shaped container and the means sealing the top access opening is a lid having a restricted vent valve associated with a spout to permit the pouring of carbonated beverage from the vessel after release of gas pressure therefrom.

26. The apparatus as claimed in claim 25 wherein the lid contains a pressure gage for measuring the pressure within the carbonation vessel.

27. The apparatus as claimed in claim 25 wherein the carbonation vessel is of a size and shape suitable for placing in a refrigerator for keeping the beverage cool.

28. The apparatus as claimed in claim 25 wherein the carbonation vessel is of a size and weight which can be picked up and manually shaken to mix the ingredients within the vessel and to effect rapid carbon dioxide absorption into any liquid within the vessel.

29. The apparatus as claimed in claim 17 wherein both the reaction vessel and the carbonation vessel are equipped with excess pressure relief valves.

30. An apparatus of the type having a pair of releasably connected pressure vessels for rapidly carbonating a liquid comprising:
(A) a gas generation vessel having a sealable top access means in communication with the interior of the vessel for positioning a carbon dioxide generating compound in the vessel and to permit the insertion of water therein out of contact with said compound;
(B) lid means moveable to and from a position of sealing engagement with the top access means of the gas generation vessel;
(C) means operatively associated with the lid means to release the water into the carbon dioxide generating compound within the gas generation vessel after the vessel has been sealed, to chemically react with the water and generate carbon dioxide;
(D) a carbonation vessel including sealable access means in communication with the interior of the carbonation vessel to permit the insertion of liquid into said vessel to such a selected level as to fill a large portion of the vessel, and liquid outlet dispensing means for obtaining carbonated liquid from the carbonation vessel upon demand;
(E) means sealing the access means of the carbonation vessel;
(F) releasable means connecting the gas generation vessel and the carbonation vessel together including gas conducting means having a separable joint therein operatively connecting the interior of the gas generation vessel with the interior of the carbonation vessel to permit carbon dioxide gas to flow from the gas generation vessel to the carbonation vessel and carbonate the liquid therein; and
(G) sealing means associated with the gas conducting means, to seal both the gas generation vessel and the carbonation vessel simultaneously with the separation of the separable joint to permit the vessels to be disconnected from each other and reconnected while retaining pressure in one or both of the vessels.

31. The apparatus as claimed in claim 30 wherein the lid means has a rotatable threaded retaining ring which engages a threaded top rim portion of the gas generation vessel to secure the lid means in sealing engagement with the top of the said vessel.

32. The apparatus as claimed in claim 30 wherein the lid means is pivotally attached to the gas generation vessel by an arm means which supports the lid means when it is in the open position.

33. The apparatus as claimed in claim 30 wherein the means to release the water into the carbon dioxide generating compound is a filled water container positioned above the carbon dioxide generating compound in the gas generation vessel prior to sealing said vessel to the atmosphere, said container having a bottom which is biased in a normally closed sealing engagement with a sidewall means of the container, and external actuator means extending through the lid means into the gas generation vessel to open the bottom of the container and release the water into the carbon dioxide generating compound after the gas generation vessel has been sealed to the atmosphere.

34. The apparatus claimed in claim 33 wherein the external actuator means is a longitudinally moveable pin which is moved inwardly into the gas generation vessel by rotating a first cam carried on a cam shaft mounted on the lid means outside the said vessel thereby causing the moveable pin to bear against a guide pin attached to the bottom of the water container and force the bottom downwardly out of sealing engagement with the sidewall means to release the water from the container.

35. The apparatus claimed in claim 34 wherein the gas generation vessel has a normally open vent valve which is closed by a second cam rotated by the cam shaft which simultaneously rotates the first cam to activate release of water from the container.

36. The apparatus claimed in claim 35 wherein the lid means has a rotatable threaded retaining ring and wherein the cam shaft carries a third cam which engages the retaining ring and prevents rotation of the cam shaft until the retaining ring is screwed into a position to secure the lid means in sealing engagement with the gas generation vessel and wherein the cam shaft engages a detent on the the retaining ring and prevents the ring from being unscrewed until after the vent valve has been opened and the pressure is released from the first pressure vessel.

37. The apparatus as claimed in claim 30 wherein the carbonation vessel is a pitcher shaped container and the means sealing the sealable access means is a lid having a restrictive vent valve associated with a spout to permit the pouring of carbonated liquid from the said vessel after release of gas pressure therefrom.

38. The apparatus as claimed in claim 30 including means to prevent release of water into the carbon dioxide generating compound prior to the lid means of the gas generation vessel being in a sealed position within the access opening of the gas generation vessel.

39. The apparatus as claimed in claim 30 including means to prevent opening the lid of the gas generation vessel prior to release of internal pressure from said vessel.

* * * * *